United States Patent
Nicollini et al.

(10) Patent No.: US 7,400,285 B2
(45) Date of Patent: Jul. 15, 2008

(54) CIRCUIT FOR RECONSTRUCTING AN ANALOG SIGNAL FROM A DIGITAL SIGNAL AND TRANSMISSION SYSTEM, PARTICULARLY FOR WCDMA CELLULAR TELEPHONY, INCLUDING SUCH CIRCUIT

(75) Inventors: Germano Nicollini, Piacenza (IT); Pierangelo Confalonieri, Caponago (IT); Riccardo Martignone, Carnate (IT)

(73) Assignee: STMicroelectronics S.R.L., Agrate Brianza (Milan) (IT)

( * ) Notice: Subject to any disclaimer, the term of this patent is extended or adjusted under 35 U.S.C. 154(b) by 0 days.

(21) Appl. No.: 11/569,630

(22) PCT Filed: May 19, 2005

(86) PCT No.: PCT/IT2005/000281

§ 371 (c)(1),
(2), (4) Date: Apr. 26, 2007

(87) PCT Pub. No.: WO2005/117402

PCT Pub. Date: Dec. 8, 2005

(65) Prior Publication Data

US 2007/0262894 A1 Nov. 15, 2007

(30) Foreign Application Priority Data

May 25, 2004 (EP) ................................. 04425375

(51) Int. Cl.
*H03M 1/66* (2006.01)

(52) U.S. Cl. ..................................... 341/144; 144/143
(58) Field of Classification Search .......... 341/140–170
See application file for complete search history.

(56) References Cited

U.S. PATENT DOCUMENTS

| | | | |
|---|---|---|---|
| 5,574,455 A | 11/1996 | Hori et al. | |
| 6,216,050 B1* | 4/2001 | Ono et al. | 700/72 |
| 6,703,894 B1* | 3/2004 | Stockstad et al. | 327/552 |
| 6,911,927 B2* | 6/2005 | Wang et al. | 341/143 |
| 6,987,472 B2* | 1/2006 | Lin | 341/120 |
| 7,020,219 B2* | 3/2006 | Panasik et al. | 375/324 |
| 7,023,638 B2* | 4/2006 | Matsubara et al. | 360/51 |
| 7,054,088 B2* | 5/2006 | Yamazaki et al. | 360/65 |
| 2002/0131389 A1 | 9/2002 | Boesch et al. | |

OTHER PUBLICATIONS

PCT International Search Report PCT/IT2005/000281.

\* cited by examiner

*Primary Examiner*—Lam T Mai
(74) *Attorney, Agent, or Firm*—Hogan & Hartson LLP

(57) ABSTRACT

A circuit for reconstructing an analog signal starting from a digital input signal includes a digital to analog converter and a low pass-filter connected at the output of the converter for receiving the analog format signal and outputting a reconstructed analog signal. The low pass filter is an active filter continuous in time and current-coupled to the output of the digital-analog converter. The digital-analog converter is of the current-steering type functioning at a sampling frequency greater than the Nyquist frequency of the analog signal.

18 Claims, 4 Drawing Sheets

CIRCUIT FOR RECONSTRUCTING AN ANALOG SIGNAL FROM A DIGITAL SIGNAL AND TRANSMISSION SYSTEM, PARTICULARLY FOR WCDMA CELLULAR TELEPHONY, INCLUDING SUCH CIRCUIT

The present invention relates to the technical field of wideband transmission systems, particularly for employment in mobile communication systems that adopt the WDCMA standard, and particularly refers to a circuit for reconstructing an analog signal from a digital signal and a transmission system including such circuit.

Digital cellular telephones, or more in general mobile communications digital devices, employ quadrature modulation (I/Q) to vary the frequency or the phase of a radio frequency carrier. Two signals are needed for this type of modulation, usually indicated by I and Q, which modulate the carrier, respectively, in phase and in quadrature (out of phase by 90°). The two modulated carriers are summed with each other to obtain a composite signal to be transmitted. FIG. 1 shows a block diagramme of the transmission section of a cellular telephone (represented in schematic form in FIG. 6). A modulator MOD receives as input a radio frequency carrier generated by a local oscillator OSC and two analog signals I and Q that contain the information to be transmitted and emits a composite signal that is applied to a final transmission stage TRANS. The transmission stage generates a radio frequency signal that respects a predetermined emission mask that is defined by the organization that assigns and regulates the emission of radio frequency signals and defines the maximum disturbance (interference) that a transmitter is permitted to cause to the frequencies of other standards.

With a view to obtaining the signals I and Q, an analog signal, the output signal of a microphone (MIC) for example, is amplified in an amplifier (AMPL), filtered in a filter (FILTER), converted into digital form in an analog-digital converter (ADC) and elaborated in a digital signal processor (DSP) that comprises, among others, a digital filter characteristic of the employed cellular standard. Two digital signals issue from the processor (DSP), each of which has its amplitude quantized by a digital-analog converter (DAC). The two signals are filtered by respective reconstruction filters continuous in time (LOW-PASS), in practice two active low-pass filters, that have the effect of eliminating the images around the conversion frequency of the converter and its harmonics, typical of a signal quantized in amplitude. The signals on the output side of the filters are the input signals I and Q of the modulator (MOD).

The need for reducing both the size and the consumption of cellular telephones to the greatest possible extent has led to the design of integrated circuits containing the entire analog and digital processing system right through to the generation of the signals I and Q on a single silicon chip. In particular, for converting the digital signals issuing from the digital filter, i.e. from the DSP processor in FIG. 1, there have been proposed various reconstruction structures, as are schematically represented in FIGS. 2, 3 and 4 of the attached drawings. In the reconstruction structure of FIG. 1 the digital input signal (Digital Input), typically constituted by a number of bits greater than 10 arriving from the processor (DSP) of FIG. 1, is applied to the input of a one-bit sigma-delta modulator (Digital Delta-Sigma Modulator). The reconstruction filter is made up of a first switched capacitance filter ($3^{rd}$ order SC Filter), of the third order in this example, and a continuous time filter (External RC Filter). As output one obtains a differential analog signal (Analog Output). The sigma-delta modulator and the switched capacitance filter are oversampled, i.e. they function at a frequency fs much greater than the frequency of the signal in the base band to be processed.

In the reconstruction structure of FIG. 3 the input signal (Digital Input), 10 bit in this example, is applied as input to a 10-bit oversampled switched capacitance filter (SC DAC) at a frequency fs and the reconstruction filter is made up of a $4^{th}$ order switched capacitance filter ($4^{th}$ order SC Filter), oversampled at a frequency 3fs (three times the frequency of the converter) and a fourth order filter continuous in time (4th order RC Filter).

The reconstruction structures of FIGS. 2 and 3 are suitable for being used in applications in which the band of the signal to be processed amounts at the very most to a few hundred KHz, as in the GSM standard. For larger signal bands, for example 1.92 MHz as in the case of the MCDMA standard, consumption would become very high, so that in practice use of these reconstruction structures has to be excluded. In the case of FIG. 2, for example, the sampling frequency fs of the DAC and, the switched capacitance filter should be 108 MHz and, in the case of FIG. 3, the sampling frequency fs of the DAC should amount to 64 MHz and that of the filter (3fs) to 192 MHz. As is known to persons skilled in, the art of this sector, current consumption in this type of circuit rises in an exponential manner as the sampling frequency increases. This is due to the fact that, if one is to obtain that the charge transfer transients settle down completely at a precision greater than the one required (10 bit for example), one has to realize amplifiers with a band-gain product greater than 1 GHz. With the known structures one would typically have current consumptions of a few hundred mA, that is to say, too high for applications in mobile equipment.

The reconstruction structure of FIG. 4, described in detail in an article by Tsung-Yuan Chang and others entitled "Analog front-end IC for 3G WCDMA" published in "2002 Symposium on VLSI circuit digest of technical papers", has been developed expressly for applications of the WCDMA standard. To avoid the problems associated with the use of switched capacitance circuits like those of FIGS. 1 and 2, use is made of a 10-bit differential DAC sampled at 15.36 MHz of the type that employs a resistive network for quantizing the digital input codes (R-2R DAC) and an active differential RC filter ($5^{th}$ order RC Filter). The problem of this solution is that, if excessive consumption is to be avoided and the precision of the resistances needed to assure a resolution of 10 bits is to be obtained, the resistances of the DAC have to be rather great and this implies a considerable occupation of integrated circuit area and great parasite capacitances, associated with the resistances, that impose a reduction of the maximum sampling frequency of the converter. Furthermore, the reconstruction filter has to have a very steep transition band and therefore has to be of a very high order (the fifth order in the example). Realization of a high-order filter calls for several operational amplifiers, which contribute in a substantial manner to the overall consumption and occupy a non-negligible integrated circuit area, and a calibration circuit for the cut-off frequency (−3 dB), which—as is well known—can shift widely (+/−40%) from the design value on account of the variability of the manufacturing parameters and the temperature. A cut-off frequency calibration circuit is necessary because the ratio between the sampling frequency (15.36 MHz) and the signal band (1.92 MHz) is rather low, so that the cut-off frequency has to have a very precise value if the filter is to let the maximum signal frequency pass unaltered and sufficiently attenuate the images around the sampling frequency. All said and done, therefore, the silicon area needed for integration is rather extensive and current consumption is still relatively high (several tens of mA).

Principal purpose of the present invention is to propose a circuit for reconstructing an analog signal starting from a digital signal that can be integrated in a relatively small area and has a current consumption smaller than that of the prior art described hereinabove.

This aim is achieved by realizing the reconstruction circuit as defined in general terms in claim 1 and as defined in the form of particular embodiments in the dependent claims.

A further object of the present invention is to provide a wide-band transmission system, particularly for the employment in cellular telephony systems, or more in general mobile communication systems, that adopt the WCDMA standard, as defined in the appended claim 16.

A further object of the present invention is to provide a mobile communication device as defined in the appended claim 18.

The invention will be more readily understood from the following description of a particularly preferred embodiment thereof given in combination with the attached drawings, of which:

Figure 1:
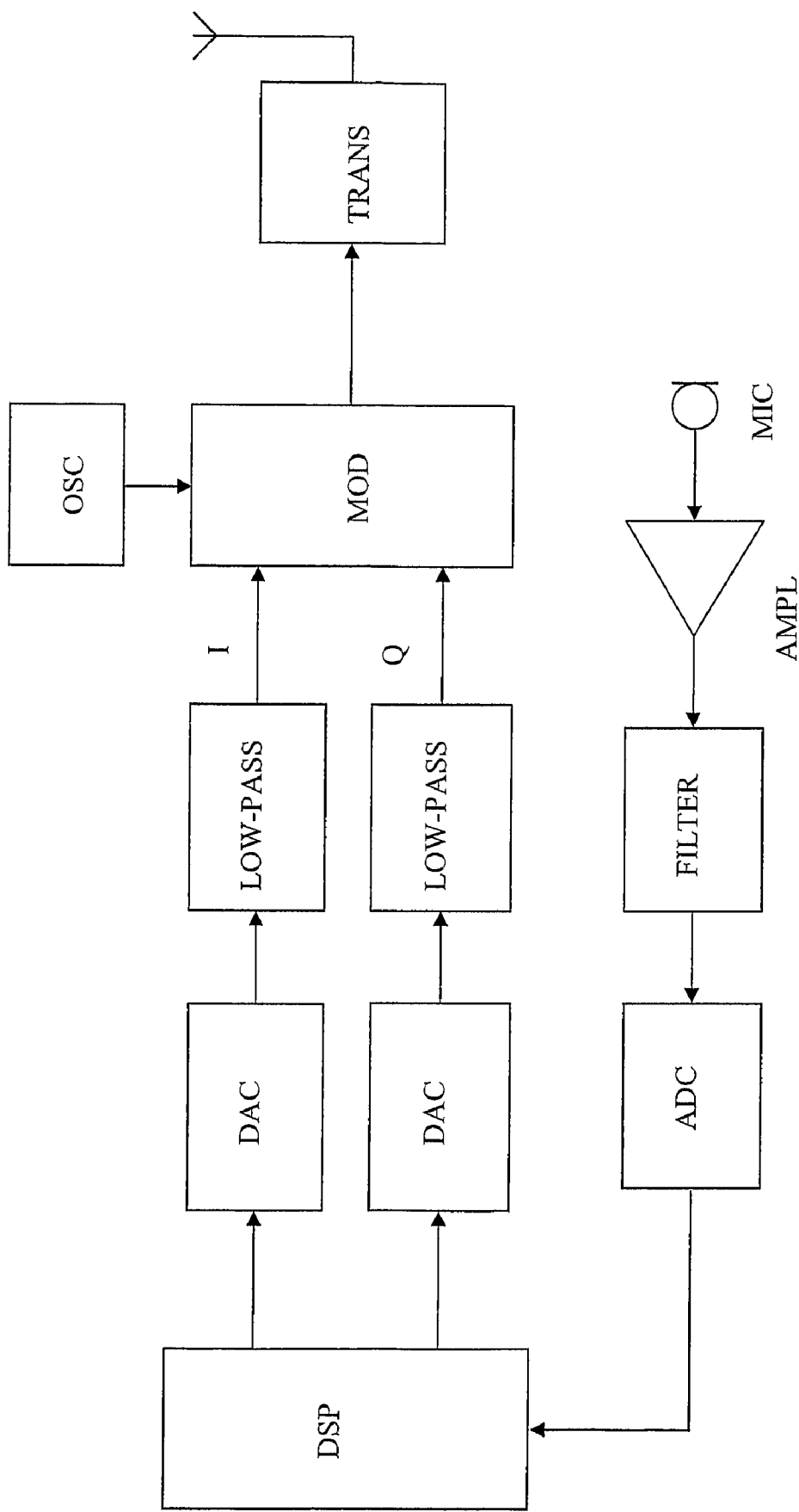
FIG. 1 is a block diagramme showing the circuit structure of a part of a cellular telephone that comprises a transmission section.
Figure 2:
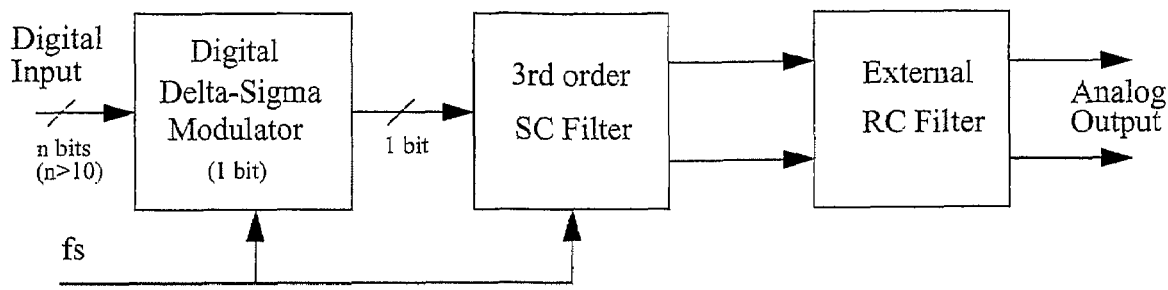
FIGS. 2, 3 and 4 are block diagrammes that illustrate three known structures, each of which comprises an analog-digital converter and a reconstruction filter of a transmission section.
Figure 3:
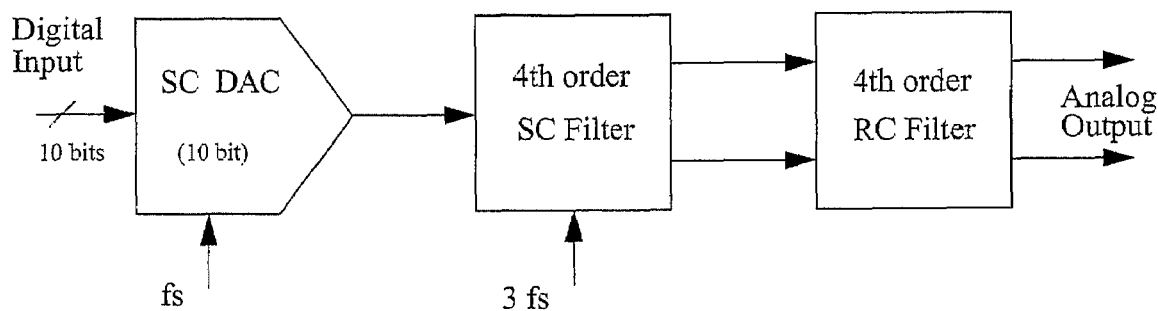
Figure 5:
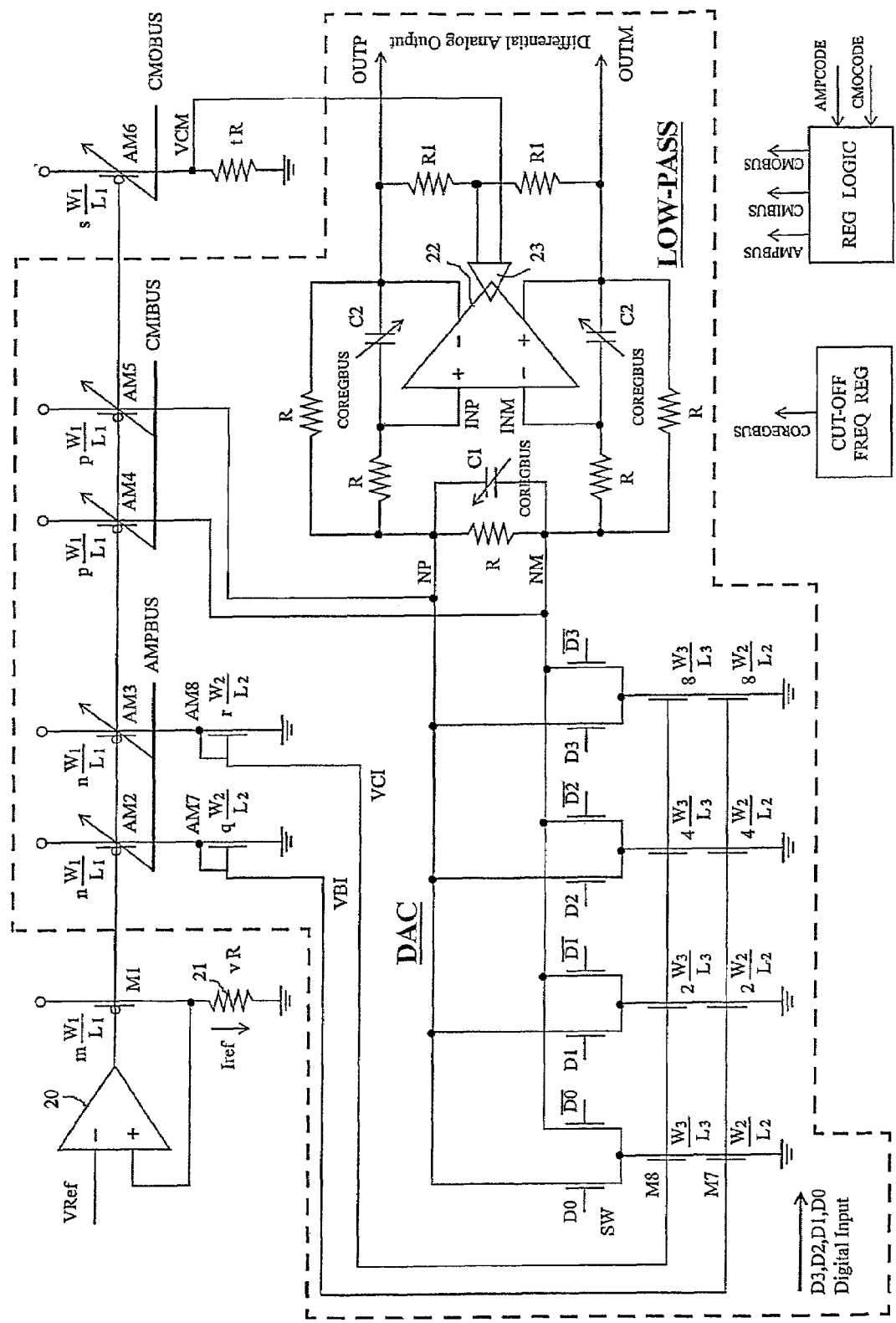
FIG. 5 shows a layout, partly as a circuit and partly as a block diagramme, of a reconstruction circuit according to the present invention including a digital-analog converter and a reconstruction filter.
Figure 6:
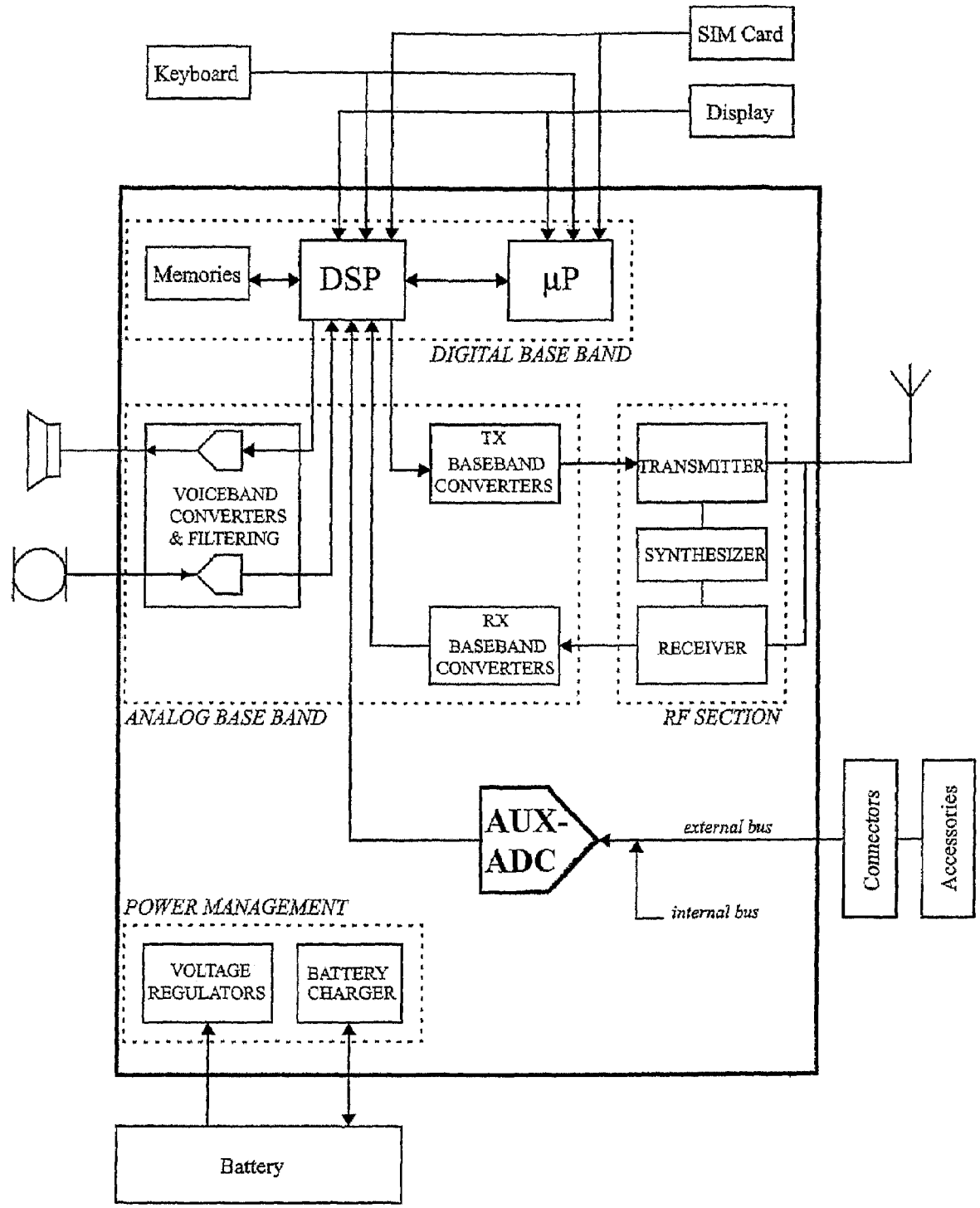
FIG. 6 shows in schematic form the structure of a cellular telephone that can incorporate a transmission system including a reconstruction filter in accordance with the invention.

FIG. 5 shows a circuit arrangement, or reconstruction circuit, comprising a digital-analog converter (DAC) and a filter (LOW-PASS) that can be advantageously used, respectively, for the block DAC and the block LOW-PASS in a transmission front-end of a mobile phone, or more in general mobile communication device, like the one of FIG. 1. Advantageously, the DAC is of the current steering type (Current Steering DAC) and the low-pass filter is an active filter, preferably of the differential Butterworth type, in the example realized as a Rauch filter. In a particularly preferred embodiment, the filter is directly current-coupled with the DAC output and is, preferably and without any limitation, a second order filter. In alternative embodiments, the filter is for example a first or third order filter.

The DAC shown in the figure consists of no more than 4 bits for simplicity of illustration; in practice, however, the number of bits, i.e. the resolution of the DAC, will be greater, 10 bits for example, when it is to be applied to a transmission system in accordance with the WDCMA standard.

The shown reconstruction circuit refers to the generation of just one of the signals I and Q destined to modulate a radio frequency carrier to be transmitted; it is therefore to be understood that in practice there will be provided a substantially identical circuit for the generation of the other signal. More precisely, the two reconstruction circuits will each contain a portion equal to the one shown in the area within the broken-line of FIG. 5 and will have in common the portions shown outside the broken line.

In the layout there are represented N-channel MOS transistors and P-channel transistors that are each constituted by a certain number of elementary transistors connected in parallel with each other. The elementary transistors are of three different types in the present example and are identified by the respective ratios (W/L) between channel width and length: W1/L1, W2/L2 and W3/L3. The number (m,n,p,s,q,r,2,4,8) of the elements that make up a transistor is indicated before the symbol of the ratio W/L. The resistors indicated in the layout have resistances of the value R or multiples of R (v and t are preferably whole numbers), likewise made up of identical resistance elements. An exception is constituted by the resistors with which there is associated the symbol R1, which have a resistance that is generally not correlated with R1.

A reference current generator, known as such, constituted by an operational amplifier 20, a P-channel MOS transistor M1, constituted by m elements W1/L1, and a resistor 21 of resistance vR connected with each other as shown, generates a constant reference current Iref starting from a reference voltage Vref generated by an appropriate circuit (not shown). In particular, we have Iref=Vref/vR.

Some of the functioning parameters of the circuit can be regulated by changing the dimensions of some components. The components capable of being regulated are shown as crossed by an arrow, by the side of which there is indicated the name of the signal that determines the adjustment.

The circuit comprises five P-channel MOS transistors AM2-AM6 with the respective gate electrodes connected to the gate electrode of M1 and with the respective source electrodes connected to a terminal (positive with respect to the common terminal or ground) of a supply source, a set M7 of four N-channel MOS transistors that function as current generators of the converter, a set M8 of another four N-channel MOS transistors connected in "cascade" to the transistors of the set M7, a set SW of eight electronic switches (in practice yet other MOS transistors) connected to the transistors of the set M8 as shown. The drain electrodes of the transistors AM2 and AM3 are connected to the ground terminal via two diode-connected N-channel MOS transistors, respectively AM7 and AM8, having their respective gate electrodes connected to the gate electrodes of the transistors of, respectively, the sets, M7 and M8.

In the example, the filter included in the reconstruction circuit is a differential Rauch filter of the second order constituted by a differential operational amplifier 22, five resistors of equal resistance. R and three capacitors having adjustable capacitances C1 and C2 connected as shown in the layout. Associated with the operational amplifier 22 there is a circuit, known as such, for imposing the common mode output voltage. This circuit is represented by an operational amplifier 23 with its output inside the operational amplifier 22. The amplifier 23 has an input terminal connected to the intermediate tap of a voltage divider constituted by two resistors of equal resistance R1 connected between the differential output terminals OUTP, OUTM of the operational amplifier 22 and the other input terminal connected to the drain electrode of the transistor AM6, which is also connected to ground via a resistor of resistance tR. The drain electrodes of the transistors AM4 and AM5 are connected, respectively, to the input nodes NP and NM of the filter, which are also connected to the electronic switches of the set SW as shown. The digital input signal, represented by a four-bit word D3, D2, D1, D0, is applied, either directly or in the negated state, to the control terminals of the electronic switches of the set SW. The differential output of the operational amplifier 22 is also the analog output of the reconstruction circuit arrangement comprising the DAC and the Rauch filter.

Let us now consider the functioning of the circuit complex shown in FIG. 5.

The current Iref is mirrored through AM2 onto AM7 and from AM7 onto the transistors of the set M7, so that the latter are crossed by currents determined by their own dimensions and the dimensions and biases of the transistors AM2 and AM7. The transistors of the set M8 are biased by a predetermined voltage obtained by mirroring the current Iref through AM3 onto AM8 and their function is the one, typical of a "cascade" connection, of reducing any excursions of the drain voltages of the transistors of the set M7 for the purposes of a better linearity of the converter, as is clear to the person skilled in the art.

The transistors of the set M7 are dimensioned in such a manner as to function as generators of four different currents weighted in binary code. In practice they are constituted, respectively, by 1, 2, 4, 8 elementary transistors of equal size W2/L2. The bit D0 of the input data is the least significant bit (LSB) and controls the generator that comprises the transistor of size W2/L2 and the bit D3 is the most significant bit (MSB) and controls the generator that comprises the transistor of size 8W2/L2. As already mentioned above, when applied to a transmission system in accordance with the WCDMA standard, the number of bits will be greater, for example 10 bits. In that case, as is well known to persons skilled in the art, it will be convenient to utilize a set of current generators for the less significant bits (lower array), this with a view to reducing the total number of components, and a set of current generators steered in accordance with a thermometric decoding criterion for the more significant bits (upper array) in order to obtain a good DNL (Differential Non-Linearity) coefficient with occupation of a limited area of the integrated circuit.

The two electronic switches SW associated with each generator M7 will be alternately open or closed according to the state of the respective input bit. More particularly, each generator M7 will cause the differential output voltage of the operational amplifier to increase or to diminish. The overall current supplied to the load circuit, consisting substantially of the feedback resistors of the operational amplifier 22, will be the analog parameter corresponding to the digital input signal. The differential output voltage Vout of the operational amplifier 22 will be Vout=(IP−IM)*R, where IP and IM are the currents that flow in the generators starting from, respectively, the nodes NP and NM, and R is the resistance of the one or the other of the feedback resistors. Since the two feedback resistors both have a resistance accurately correlated with the resistance of the resistor 21 of the reference current generator, the output voltage of the operational amplifier 22 represents the digital input signal with great precision.

It should be noted that in the particular embodiment shown, advantageously, the filter is of the second order and therefore has a good phase linearity and a low pass-band ripple. Furthermore, it advantageously utilizes a single operational amplifier that also has the function of output stage of the DAC.

The circuit comprising the operational amplifier 23 and the transistor AM6 has the function of imposing a common mode voltage VCM on the output of the differential operational amplifier 22. This voltage VCM is obtained by mirroring the current Iref via the transistor AM6 onto the resistor of resistance tR. Fixing a suitable value for tR, i.e. the resistance between the drain electrode of AM6 and ground, and appropriately regulating the size of the transistor AM6, it becomes possible to appropriately regulate the voltage VCM within ample limits. Thanks to this regulation possibility, it is easy for the output of the filter to be D.C. adapted to the input of the downstream circuit, in this case the radio frequency mixer (not shown) of the modulator, thereby avoiding the use of coupling capacitors.

Having fixed the common mode output voltage VCM and the dynamics of the operational amplifier output 22, i.e. having fixed the feedback resistance R, the voltages of the nodes NP and NM and the common mode input voltage may in some applications assume non-optimal values of the biasing of the DAC. In the greater part of cases the voltages of the nodes NP and NM tend to be too low. With a view to obtaining optimal functioning conditions in the circuit represented in FIG. 5, the transistors AM4 and AM6, which provide positive currents to the nodes NP and NM, are regulated in such a manner as to raise these voltages. The regulation is obtained by varying the number of the elementary transistors that constitute the transistors AM4 and AM5. The current necessary for correctly biasing the nodes NP and NM can be obtained from the relationship:

$$VNP,M = VCM - (IDACtot/2 - I(AM4,5))*R$$

where VNP,M indicates the voltage of the node NP or the node NM, IDACtot stands for the sum of all the currents of the generators M7 and I(AM4, 5) indicates the current provided by the transistors AM4, AM5, respectively, to the nodes NP and NM. In the rather improbable case that it becomes necessary to lower the voltage of the nodes NP and NM, one may realize a further current mirroring to steer a pair of N-channel MOS transistors that, just like the P-channel transistors AM4 and AM5, are made up of a set of elementary transistors connected, respectively, between the nodes NP and NM and ground.

The output amplitude, i.e. the maximum value of the difference between the output voltages OUTP-OUTM, can be regulated by varying the number n of the elementary transistors that constitute the transistors AM2 and AM3. This regulation possibility, together with the one concerning the voltage VCM, confers a great use versatility upon the DAC and filter arrangement, because it makes it possible to user mixers having different input dynamics without having to have recourse to supplementary components or circuits. Moreover, advantageously, the output amplitude regulation and the output common mode voltage regulation can be performed also dynamically and in real time during the reconstruction of the analog signal, for example as a consequence of, a closed-loop control. As a consequence of said regulations, also the input common mode voltage could be regulated dynamically, in order to keep optimum working conditions for the DAC.

The signals needed for the various regulations are digital signals produced within a logic unit represented in FIG. 5 by a block indicated as REG LOGIC. In particular, this unit receives as input two codes AMPCODE and CMOCODE generated by a central logic control unit of the transmission system (not shown) and produces as output a signal on a bus, indicated by AMPBUS, that regulates the number of habilitated elements of the transistors AM2 and AM3, a signal CMOBUS that regulates the number of habilitated elements of hte transistor AM6 and a signal CMIBUS that regulates the number of habilitated elements of the transistors AM4 and AM5.

The transistors that constitute the current generators of the set M7 are dimensioned with relatively great channel lengths L (to have a high "overdrive" and a low functioning current). The high overdrive makes it possible to obtain a better matching and therefore smaller areas, while a great channel length L makes possible low functioning currents (given identical overdrives) and therefore very low consumptions. This type of configuration, given identical signal pass band, makes possible a much higher sampling frequency of the prior art converters without this involving, as one might expect, a particular complexity of the DAC and a considerable increment of the absorbed current. The sampling frequency has in any case to be much greater than the Nyquist frequency (which, as is well known, is double the useful band width of the signal): $f_N$=3.84 MHz in the WCMDA standard. Advantageously, the DAC is designed to function at a sampling frequency comprised between greater than six times the Nyquist frequency, preferably greater than eight times such frequency and more preferably comprised between 8 and 16 times the Nyquist frequency (30.72-61.4 MHz). In practice it has been noted that it is possible to attain and exceed sampling frequencies of 128 MHz with not particularly complex circuit configurations, consequently the DAC sampling frequency can reach also to be 32 or 64 times the Nyquist frequency.

The use of rather high sampling frequencies, for example 61.4 MHz or more, makes it possible to overcome the intrinsic problem of the realization of the filter as integrated circuit. Indeed, it is known that the capacitances and the resistances of the filter are subject to ample excursions around their nominal design value on account of the variability of the manufacturing parameters of the integrated circuit, so that even the cut-off frequency of the filter may vary within a wide range of values. This ample tolerance of the real value of the cut-off frequency does not prejudice the correct functioning of the reconstruction circuit arrangement constituted by the DAC and the filter described above if the sampling frequency is sufficiently high. Indeed, the "image" bands around the sampling frequency and its multiples are further removed from the base band when the sampling frequency is higher, so that even a filter of the second order having a not very precise cut-off frequency makes it possible to eliminate the undesired bands.

In the case of lower sampling frequencies, 38.4 MHz for example, it may become necessary to regulate the cut-off frequency. In the example of FIG. 5 there is provided a self-regulation circuit, known as such, represented by a block indicated by CUT-OFF FREQREG, that generates on a bus COREGBUS a digital code that acts on the capacitances, indicated by C1 and C2, of the filter. In practice, the capacitors of the filter are formed as groups of various capacitors that can be connected to each other in parallel by means of electronic switches. The overall capacitance of each group of capacitors is determined from time to time by opening or closing the electronic switches according to the digital value of the regulation signal present on the bus COREGBUS. In a practical case, given a sampling frequency of 38.4 MHz, the capacitor regulation was such as to obtain a cut-off frequency of 5 MHz, so that one obtained a good signal reproduction in the base band and an attenuation of the signal in the image band sufficient to respect the specifications of the emission mask.

Moreover, in the case of sampling frequencies lower than six times the Nyquist frequency, it could be required to use a filter with an order greater than the second order, for example a third order filter.

In a particularly advantageous alternative embodiment it possible to provide a first order passive low-pass filter following the active low-pass filter. Such passive filter has preferably, and without any limitation, a cut-off frequency much greater (for example, ten times greater) of the cut-off frequency of such active filter. Alternatively, such cut off frequency can be equal or comparable to the cut-off frequency of the active filter but, in this case, as is well-known to the expert of the field, it is required to suitably re-design the active filter for taking into account of the shifting of the cut-off frequency of the cascade of the active and passive filter (with respect the cut-off frequency of the active filter) due to the presence of the passive filter.

Figure 4:
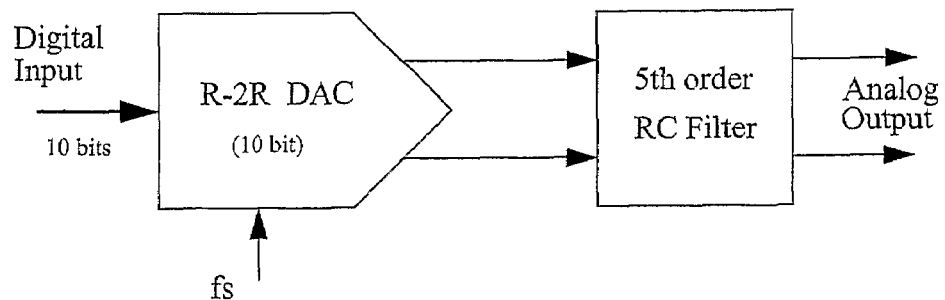

In a practical application of the combination of DAC and filter in a transmission system in accordance with the invention as described above there was measured a current consumption of a few mA, i.e. a consumption of at least one order of magnitude smaller than the consumption of the prior art illustrated in relation to FIG. 4. To this advantage one has to add the advantages of a relatively modest circuit complexity and a reduced occupation of the integrated circuit area.

Naturally, in order to satisfy contingent and specific requirements, a person skilled in the art may apply to the above-described reconstruction circuit and transmission system according to the invention many modifications and variations, all of which, however, are included within the scope of the invention as defined by the appended claims.

The invention claimed is:

1. Circuit for reconstructing an analog signal starting from a digital input signal, said circuit comprising:
a digital to analog converter suitable for receiving said digital signal and converting it into signal in analog format; and
a low pass-filter connected at the output of said converter for receiving said signal in analog format and providing as output said reconstructed analog signal;
wherein the low pass filter is a second order active filter continuous in time and current-coupled to the output of the digital-analog converter and wherein the digital-analog converter is a converter of the current-steering type functioning at a sampling frequency greater than the Nyquist frequency of said analog signal.

2. Circuit for reconstructing an analog signal starting from a digital input signal, said circuit comprising:
a digital to analog converter suitable for receiving said digital signal and converting it into signal in analog format; and
a low pass-filter connected at the output of said converter for receiving said signal in analog format and providing as output said reconstructed analog signal;
wherein the low pass filter is an active filter continuous in time and current-coupled to the output of the digital-analog converter, wherein the digital-analog converter is a converter of the current-steering type functioning at a sampling frequency greater than the Nyquist frequency of said analog signal,
wherein said low-pass filter includes at least an operational amplifier and wherein said amplifier represents the output stage of said digital to analog converter.

3. Circuit according to claim 2, wherein said filter further includes feedback resistors of said operational amplifier and wherein said converter is such to convert said digital signal into said signal in analog format in the form of a current directly injected into said feedback resistors.

4. Circuit according to claim 3, wherein said digital to analog converter includes a reference current generator including a resistor having a first resistance and wherein said feedback resistors have a second resistance accurately correlated with said first resistance.

5. Circuit according to claim 2, wherein said sampling frequency is greater than about eight times said Nyquist frequency.

6. Circuit according to claim 3, wherein said sampling frequency is greater than sixteen times said Nyquist frequency.

7. Circuit for reconstructing an analog signal starting from a digital input signal, said circuit comprising:
a digital to analog converter suitable for receiving said digital signal and converting it into signal in analog format; and
a low pass-filter connected at the output of said converter for receiving said signal in analog format and providing as output said reconstructed analog signal;
wherein the low pass filter is an active filter continuous in time and current-coupled to the output of the digital-analog converter and wherein the digital-analog converter is a converter of the current-steering type functioning at a sampling frequency greater than about six times the Nyquist frequency of said analog signal.

8. Circuit for reconstructing an analog signal starting from a digital input signal, said circuit comprising:
a digital to analog converter suitable for receiving said digital signal and converting it into signal in analog format; and
a low pass-filter connected at the output of said converter for receiving said signal in analog format and providing as output said reconstructed analog signal;
wherein the low pass filter is an active filter continuous in time and current-coupled to the output of the digital-analog converter and wherein the digital-analog converter is a converter of the current-steering type functioning at a sampling frequency greater than the Nyquist frequency of said analog signal, and wherein the converter has a differential output and the filter has a differential input and output.

9. Circuit for reconstructing an analog signal starting from a digital input signal, said circuit comprising:
- a digital to analog converter suitable for receiving said digital signal and converting it into signal in analog format;
- a low pass-filter connected at the output of said converter for receiving said signal in analog format and providing as output said reconstructed analog signal; and
- means for regulating the output amplitude of the converter, wherein the low pass filter is an active filter continuous in time and current-coupled to the output of the digital-analog converter and wherein the digital-analog converter is a converter of the current-steering type functioning at a sampling frequency greater than the Nyquist frequency of said analog signal.

10. Circuit in accordance with claim 9, wherein the regulating means for the output amplitude of the converter, the bias of the differential inputs of the filter and the common mode output voltage of the filter have a regulating unit in common.

11. Circuit for reconstructing an analog signal starting from a digital input signal, said circuit comprising:
- a digital to analog converter suitable for receiving said digital signal and converting it into signal in analog format;
- a low pass-filter connected at the output of said converter for receiving said signal in analog format and providing as output said reconstructed analog signal; and
- means for regulating the common mode output voltage of the filter, wherein the low pass filter is an active filter continuous in time and current-coupled to the output of the digital-analog converter and wherein the digital-analog converter is a converter of the current-steering type functioning at a sampling frequency greater than the Nyquist frequency of said analog signal.

12. Circuit for reconstructing an analog signal starting from a digital input signal, said circuit comprising:
- a digital to analog converter suitable for receiving said digital signal and converting it into signal in analog format;
- a low pass-filter connected at the output of said converter for receiving said signal in analog format and providing as output said reconstructed analog signal; and
- means for regulating the differential input bias of the filter, wherein the low pass filter is an active filter continuous in time and current-coupled to the output of the digital-analog converter and wherein the digital-analog converter is a converter of the current-steering type functioning at a sampling frequency greater than the Nyquist frequency of said analog signal.

13. Circuit for reconstructing an analog signal starting from a digital input signal, said circuit comprising:
- a digital to analog converter suitable for receiving said digital signal and converting it into signal in analog format;
- a low pass-filter connected at the output of said converter for receiving said signal in analog format and providing as output said reconstructed analog signal; and
- means for regulating the cut-off frequency of the filter, wherein the low pass filter is an active filter continuous in time and current-coupled to the output of the digital-analog converter and wherein the digital-analog converter is a converter of the current-steering type functioning at a sampling frequency greater than the Nyquist frequency of said analog signal.

14. Circuit in accordance with claim 13, wherein the filter comprises an operational amplifier and a network of resistors and capacitors and means for regulating the cut-off frequency comprise means for modifying the capacitance of at least one of the capacitors.

15. A wide-band transmission system, particularly for employment in cellular telephony systems that adopt the WCDMA standard, comprising:
- means for generating two digital signals containing information to be transmitted,
- means for converting into analog form the two signals comprising, for each signal to be converted, a digital-analog converter followed by a low-pass filter,
- means for modulating a radio frequency carrier both in phase and quadrature with the two signals issuing from the low-pass filters, and
- means for transmitting the modulated carrier in accordance with a predetermined emission mask,
- wherein said low-pass filter and said digital-analog converter makes part of a circuit for reconstructing an analog signal starting from a digital input signal, said circuit comprising:
- a digital to analog converter suitable for receiving said digital signal and converting it into signal in analog format; and
- a low pass-filter connected at the output of said converter for receiving said signal in analog format and providing as output said reconstructed analog signal;
- wherein the low pass filter is an active filter continuous in time and current-coupled to the output of the digital-analog converter and wherein the digital-analog converter is a converter of the current-steering type functioning at a sampling frequency greater than the Nyquist frequency of said analog signal.

16. A system in accordance with claim 15, comprising a constant current generator that provides to each of the converters of the two signals to be converted a reference current on a resistor of predetermined resistance, wherein each low-pass filter comprises at least one resistor having a resistance correlated with the resistance of the resistor of the reference current generator.

17. A system in accordance with claim 16, wherein said filter and said converter includes means for regulating the common mode output voltage comprising a resistor having a resistance correlated with the resistance of the resistor of the reference current generator and are common to both the converters.

18. Mobile communication device comprising a transmission system in accordance with claim 15.

* * * * *